(12) United States Patent
Ooba et al.

(10) Patent No.: US 7,520,616 B2
(45) Date of Patent: Apr. 21, 2009

(54) VEHICULAR VISUAL ASSISTANCE SYSTEM

(75) Inventors: Yasuyuki Ooba, Miyazaki (JP); Junichi Kimura, Miyazaki (JP)

(73) Assignee: Kabushiki Kaisha Honda Lock, Miyazaki (JP)

( * ) Notice: Subject to any disclaimer, the term of this patent is extended or adjusted under 35 U.S.C. 154(b) by 124 days.

(21) Appl. No.: 11/024,246

(22) Filed: Dec. 28, 2004

(65) Prior Publication Data

US 2005/0168695 A1 Aug. 4, 2005

(30) Foreign Application Priority Data

Jan. 16, 2004 (JP) ............................. 2004-009726

(51) Int. Cl.
*G03B 21/14* (2006.01)
(52) U.S. Cl. ........................................ 353/13
(58) Field of Classification Search ............. 353/11, 353/12, 13, 14, 28; 396/419, 429; 348/148
See application file for complete search history.

(56) References Cited

U.S. PATENT DOCUMENTS

| | | | | |
|---|---|---|---|---|
| 5,281,985 | A * | 1/1994 | Chan | 353/13 |
| 6,341,869 | B1 * | 1/2002 | Inami et al. | 353/28 |
| 7,423,521 | B2 * | 9/2008 | Kukita et al. | 340/425.5 |
| 2002/0005778 | A1 * | 1/2002 | Breed et al. | 340/435 |
| 2002/0087296 | A1 * | 7/2002 | Wynn | 703/8 |
| 2003/0020880 | A1 * | 1/2003 | Knoll et al. | 353/13 |
| 2003/0151563 | A1 * | 8/2003 | Kulas | 345/7 |
| 2003/0193651 | A1 | 10/2003 | Egle | |
| 2006/0171704 | A1 * | 8/2006 | Bingle et al. | 396/419 |
| 2008/0204557 | A1 * | 8/2008 | Kubota et al. | 348/148 |
| 2008/0258888 | A1 * | 10/2008 | Kubota et al. | 340/436 |

FOREIGN PATENT DOCUMENTS

| | | |
|---|---|---|
| DE | 295 08 198 U1 | 8/1995 |
| DE | 198 16 054 A1 | 10/1998 |
| DE | 102 15 893 C1 | 10/2003 |
| EP | 1285 814 A1 | 8/2001 |
| JP | 2000-122176 | 4/2000 |
| JP | 2003-075893 | 3/2003 |
| JP | 3092719 | 3/2003 |
| JP | 2004-064131 | 2/2004 |
| JP | 2005-125828 | 5/2005 |
| JP | 2005-182305 | 7/2005 |
| JP | 2005-184225 | 7/2005 |

* cited by examiner

*Primary Examiner*—William C Dowling
(74) *Attorney, Agent, or Firm*—Carrier, Blackman & Associates, P.C.; Joseph P. Carrier; William D. Blackman

(57) ABSTRACT

A vehicular visual assistance system includes: a retro-reflective surface formed on an inside face of a pillar that is in a position obstructing the view of a vehicle driver seated on a driver's seat within a vehicle compartment; a camera mounted on the vehicle outside the vehicle compartment for taking an image outward from the pillar in a direction that is substantially the same as the line of vision of the vehicle driver on the driver's seat; and a projector for projecting in real time the image taken by the camera toward the retro-reflective surface of the pillar. The projector is fixedly disposed within the vehicle compartment at a position close to the eyes of the vehicle driver on the driver's seat. Thus, it is possible to eliminate a blind spot due to the pillar, thereby enhancing safety of driving.

18 Claims, 5 Drawing Sheets

VEHICULAR VISUAL ASSISTANCE SYSTEM

RELATED APPLICATION DATA

The Japanese priority application No. 2004-9726 upon which the present application is based is hereby incorporated in its entirety herein by reference.

BACKGROUND OF THE INVENTION

1. Field of the Invention

The present invention relates to a vehicular visual assistance system for enhancing the safety of driving a vehicle by eliminating a blind spot due to a pillar that obstructs the vision of a vehicle driver.

2. Description of the Related Art

Pillars are disposed on opposite sides of a windshield of a vehicle to obstruct parts of the field of view of a vehicle driver on a driver's seat, so that areas behind the pillars become blind spots when the vehicle turns left or right. It is therefore necessary to pay more attention when turning left or right, and there is a demand for eliminating such blind spots due to the pillars.

Japanese Patent Application Laid-open No. 2000-122176 discloses a technique in which an image of the background of a subject is taken in advance by a camera and the taken image is projected on an object having a retro-reflective function, thus optically erasing the subject.

By further developing the technique disclosed in Japanese Patent Application Laid-open No. 2000-122176 so that the background image taken by the camera is projected on a subject having a retro-reflective function in real time, it would be possible to optically erase the subject by showing the background on the subject in real time. Further, by applying this technique to a vehicle so as to optically erase a pillar, it would be possible for a vehicle driver to obtain a view with the pillar made transparent, thereby eliminating the blind spot due to the pillar.

SUMMARY OF THE INVENTION

The present invention has been accomplished under the above-mentioned circumstances, and it is an object thereof to provide a vehicular visual assistance system for enhancing safety of driving a vehicle by eliminating a blind spot due to a pillar.

In order to attain this object, in accordance with a first aspect of the present invention, there is provided a vehicular visual assistance system that includes: a retro-reflective surface formed on an inside face of a pillar that is in a position obstructing the view of a vehicle driver seated on a driver's seat within a vehicle compartment; a camera mounted on the vehicle outside the vehicle compartment for taking a real world image outward from the pillar in a direction that is substantially the same as the line of vision of the vehicle driver on the driver's seat; and a projector for projecting the real world image taken by camera in real time toward the retro-reflective surface of the pillar, the projector being fixedly disposed within the vehicle compartment at a position close to the eyes of the vehicle driver on the driver's seat.

In accordance with a second aspect of the present invention, in addition to the first aspect, the camera is mounted on a door mirror.

In accordance with a third aspect of the present invention, in addition to the first aspect, the camera is mounted on an outer face of a vehicle body at a position in the proximity of the pillar.

In accordance with a fourth aspect of the present invention, in addition to the first aspect, the projector is mounted on a rear view mirror.

In accordance with a fifth aspect of the present invention, in addition to the first aspect, the projector is mounted on a roof.

In accordance with a sixth aspect of the present invention, in addition to the first aspect, the projector is mounted on a headrest of the driver's seat.

With the arrangement of the first aspect, since an image of the blind spot due to the pillar is projected in real time on the retro-reflective surface formed on the inside face of the pillar, it is possible for the vehicle driver seated on the driver's seat to obtain a view in which the pillar is optically made transparent, thus eliminating the blind spot due to the pillar to enhance the safety of driving the vehicle. Moreover, since the camera takes an image outward from the pillar in the direction that is substantially the same as the line of vision of the vehicle driver on the driver's seat, and the projector is disposed at the position close to the eyes of the vehicle driver seated on the driver's seat, the amount of processing of the images of the blind spot is reduced, thus successively projecting images taken outward from the pillar on the retro-reflective surface and minimizing distortion of the projected images.

With the arrangement of the second or third aspect, it is possible to mount the camera at a position that the camera can take an image outward from the pillar in a direction that is substantially the same as the line of vision of the vehicle driver seated on the driver's seat.

With the arrangement of the fourth, the fifth, or the sixth aspect, it is possible to mount the projector at a position that is close to the eyes of the vehicle driver seated on the driver's seat.

The above-mentioned object, other objects, characteristics, and advantages of the present invention will become apparent from preferred embodiments that will be described in detail below with reference to the attached drawings.

DESCRIPTION OF THE PREFERRED EMBODIMENTS

Figure 1:
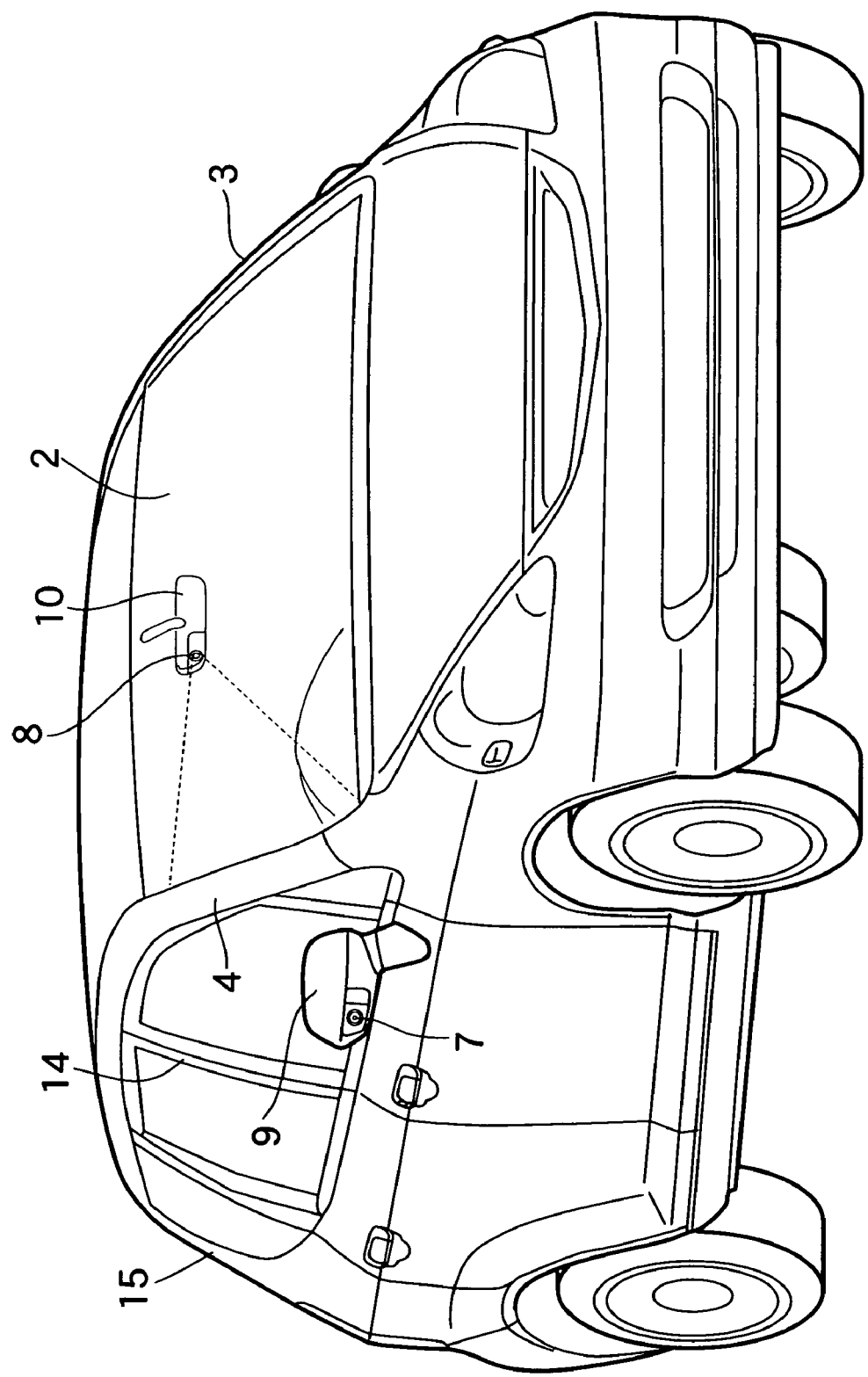
FIG. 1 is a perspective view of a vehicle according to a first embodiment when viewed from the front on the right-hand side.
Figure 2:
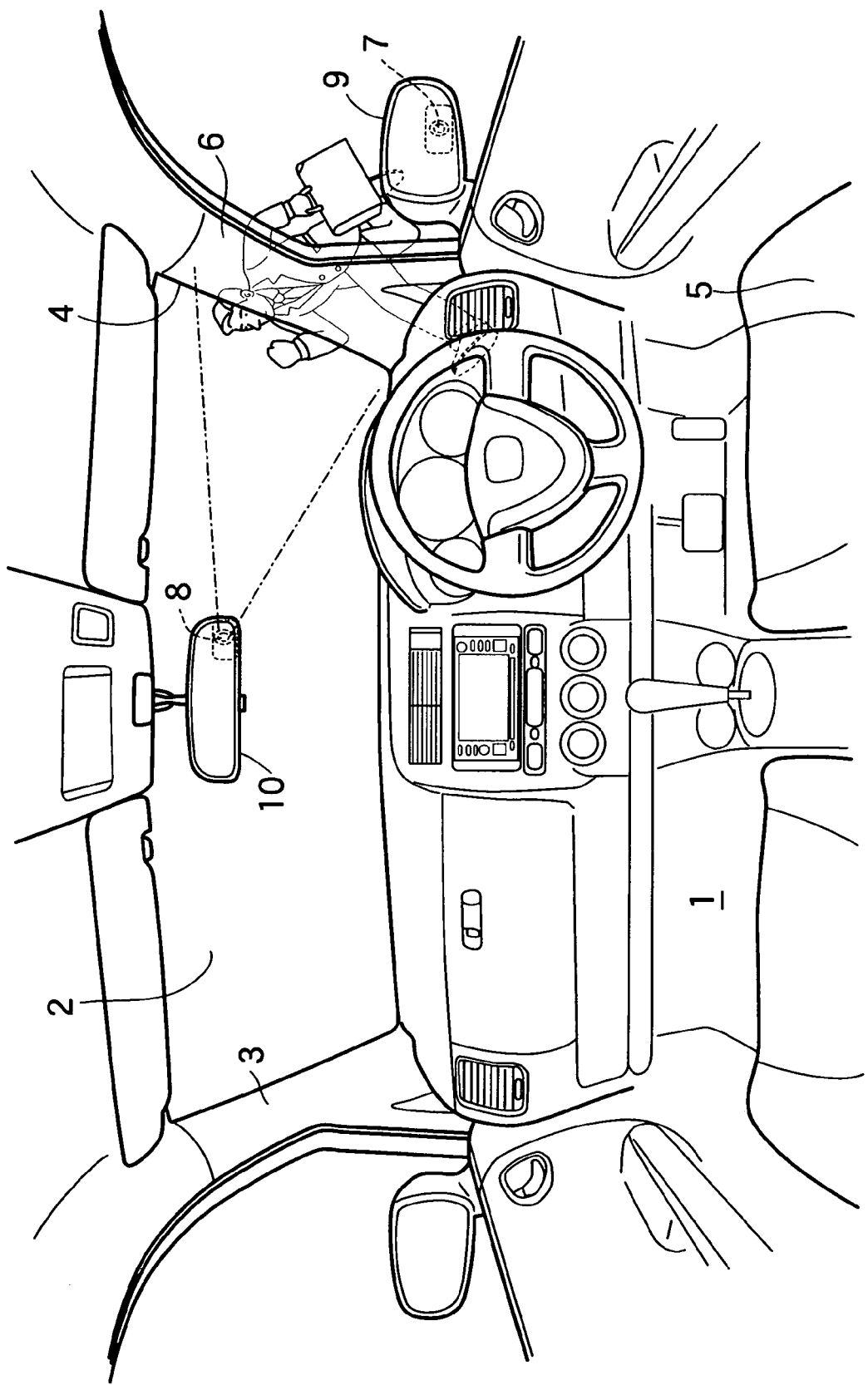
FIG. 2 is a view looking forward from a vehicle compartment.

A first embodiment of the present invention is now described with reference to FIG. 1 and FIG. 2 showing a vehicle which is a right-hand steering-wheel vehicle. When a vehicle driver seated on a driver's seat 5 disposed on the right-hand side in a front part of a vehicle compartment 1 looks forward, among pillars 3 and 4 on left and right sides of a windshield 2, the right-hand pillar 4 is positioned closer to the vehicle driver on the driver's seat 5. Therefore, the pillar 4 obstructs a relatively large area of the field of view of the vehicle driver, so that the area outward from the right-hand pillar 4 inevitably becomes a blind spot for the vehicle driver.

In order to eliminate the blind spot due to the right-hand pillar 4 obstructing the view of the vehicle driver, a retro-reflective surface 6 is formed on an inside face of the right-hand pillar 4, a camera 7 for taking an image outward from the right-hand pillar 4 is mounted on the vehicle outside the vehicle compartment 1, and a projector 8 for projecting in real time the image taken by the camera 7 toward the retro-reflective surface 6 of the right-hand pillar 4 is fixedly disposed within the vehicle compartment.

The retro-reflective surface 6 is formed by coating the inside face of the right-hand pillar 4 with a retro-reflective material, or affixing a retro-reflective material thereto. The camera 7 is, for example, a CCD camera, and is mounted on a right-hand door mirror 9 so that an image outward from the right-hand pillar 4 is taken in a direction that is substantially the same as the line of vision of the vehicle driver on the driver's seat 5. The projector 8 is mounted on a rear view mirror 10 in order to project the image from a position close to the eyes of the vehicle driver on the driver's seat 5 toward the retro-reflective surface 6 of the right-hand pillar 4.

In accordance with this first embodiment, since an image of the blind spot due to the right-hand pillar 4 is projected in real time on the retro-reflective surface 6 formed on the inside face of the pillar 4, it is possible for the vehicle driver on the driver's seat 5 to obtain a view in which, as shown in FIG. 2, the pillar 4 is optically made transparent, thus eliminating the blind spot due to the pillar 4 to enhance the safety of driving the vehicle.

Moreover, since the camera 7 takes an image outward from the right-hand pillar 4 in the direction that is substantially the same as the line of vision of the vehicle driver on the driver's seat 5, and the projector 8 is disposed at the position close to the eyes of the vehicle driver seated on the driver's seat 5 to directly project the real world image taken by the camera in real time, the amount of processing of images taken of the blind spot is reduced, thus successively projecting images taken outward from the right-hand pillar 4 on the retro-reflective surface 6 and minimizing the distortion of projected images.

Figure 3:
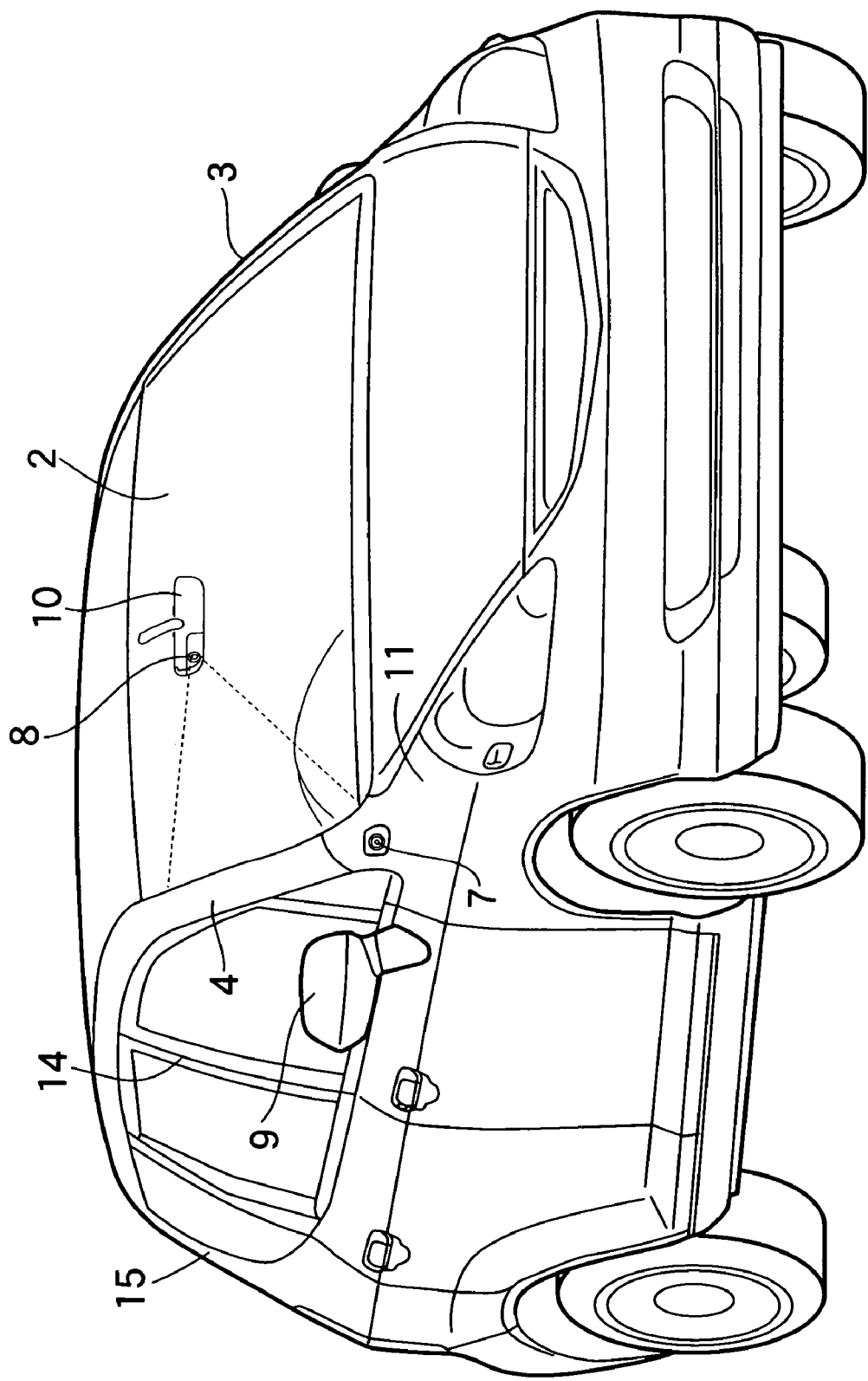
FIG. 3 is a perspective view, corresponding to FIG. 1, of a second embodiment.

FIG. 3 shows a second embodiment of the present invention. A camera 7 for taking images outward from a right-hand pillar 4 is mounted on an outer face of a vehicle body 11 at a position on the right-hand pillar 4. Also with this arrangement of the camera 7, it is possible to take images outward from the right-hand pillar 4 in a direction that is substantially the same as the line of vision of a vehicle driver seated on a driver's seat 5, thus exhibiting the same effects as those of the first embodiment.

Figure 4:
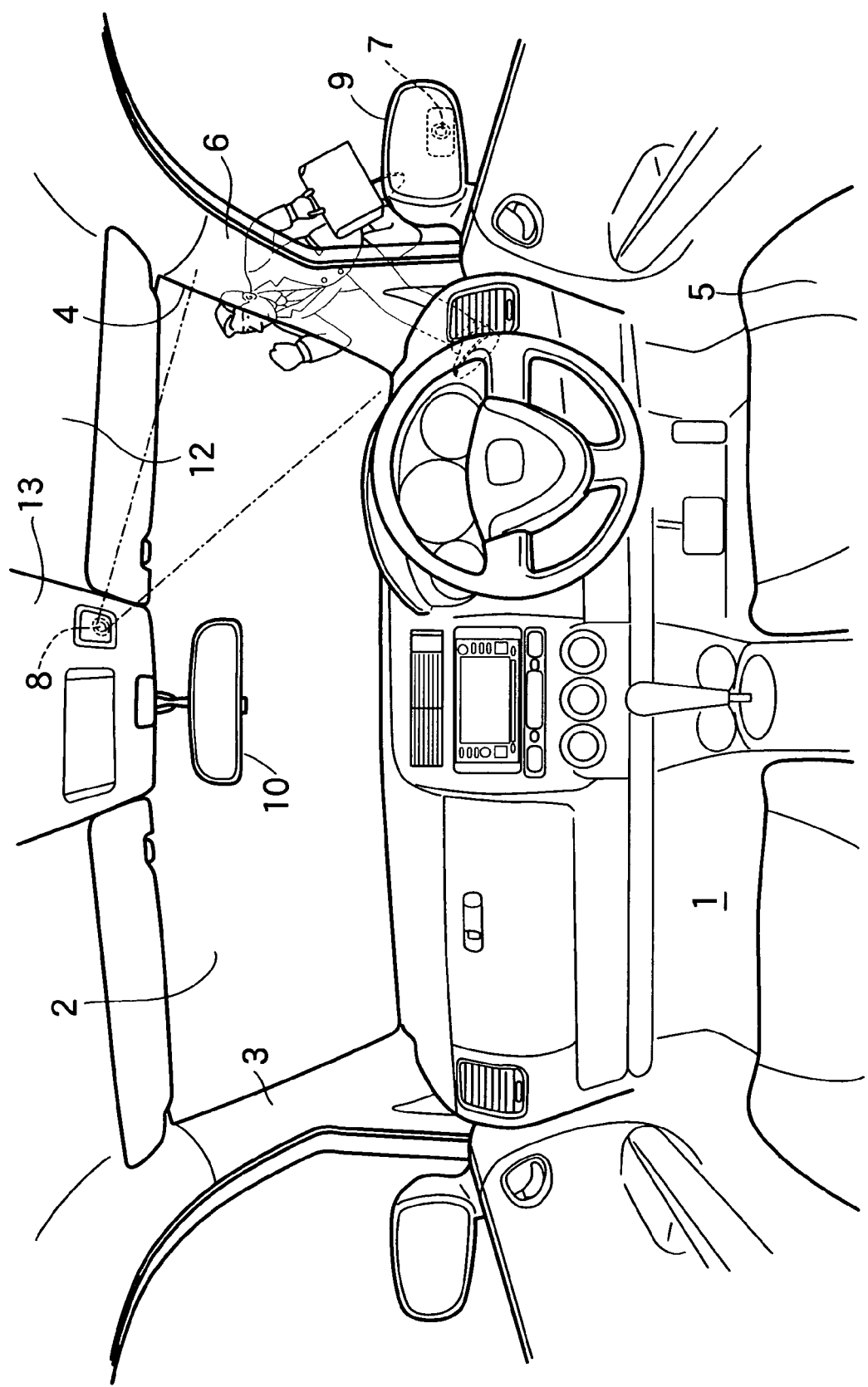
FIG. 4 is a view, corresponding to FIG. 2, of a third embodiment.

FIG. 4 shows a third embodiment of the present invention. A projector 8 for projecting an image toward a retro-reflective surface 6 of a right-hand pillar 4 is mounted on an overhead console 13 provided on a roof 12. Also with this arrangement, it is possible to arrange the projector 8 at a position close to the eyes of a vehicle driver seated on a driver's seat 5, thereby exhibiting the same effects as those of the above-mentioned embodiments.

Figure 5:
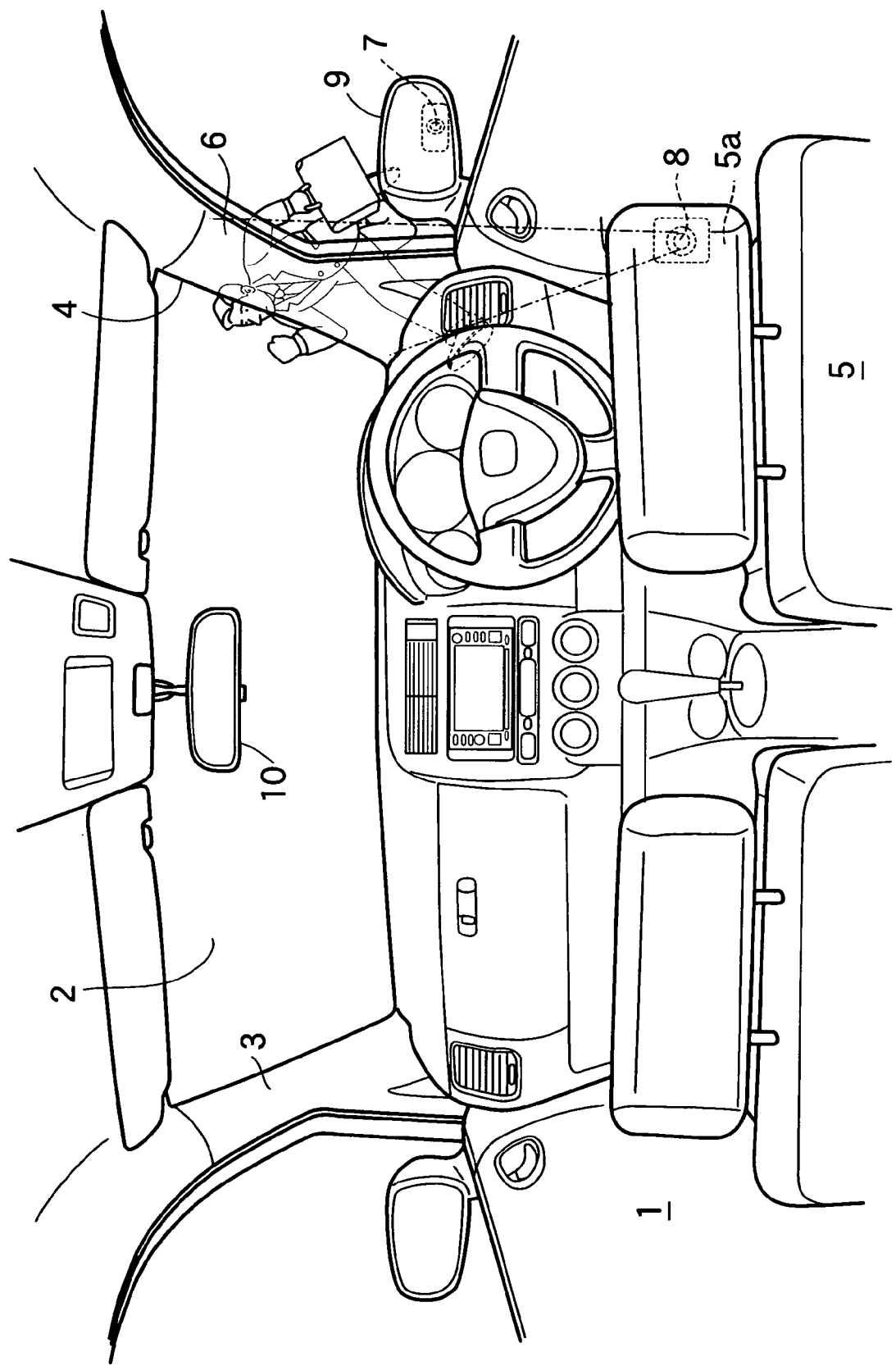
FIG. 5 is a view, corresponding to FIG. 2, of a fourth embodiment.

FIG. 5 shows a fourth embodiment of the present invention. A projector 8 for projecting an image toward a retro-reflective surface 6 of a right-hand pillar 4 is mounted on a headrest 5a of a driver's seat 5. Also with this arrangement, it is possible to arrange the projector 8 at a position close to the eyes of a vehicle driver seated on a driver's seat 5, thereby exhibiting the same effects as those of the above-mentioned embodiments.

In each of the above-mentioned embodiments, a description has been given to an arrangement for eliminating the blind spot due to the right-hand pillar 4 in a right-hand steering-wheel vehicle, but it is also possible to eliminate blind spots due to both left and right pillars 3 and 4. In this case, a pair of left and right cameras 7 are mounted on the vehicle outside a vehicle compartment 1 so that images outward from the pillars 3 and 4 are taken in directions that are substantially the same as the line of vision of a vehicle driver on a driver's seat 5, and a pair of left and right projectors 8 are fixedly disposed within the vehicle compartment 1 at positions close to the eyes of the vehicle driver on the driver's seat 5 so that images taken by the cameras 7 are projected in real time on retro-reflective surfaces 6 of inside faces of the opposite pillars 3 and 4.

Furthermore, in the above-mentioned embodiments, a description has been given to an arrangement for eliminating a blind spot on the forward side of a vehicle, but in order to eliminate a blind spot on the rearward side of the vehicle due to a center pillar 14 or a rear pillar 15 shown in FIG. 1 and FIG. 3 by making the center pillar 14 or the rear pillar 15 transparent, a real world image may be taken on the rear side, outward from the center pillar 14 or the rear pillar 15, by a camera 7 in a direction that is substantially the same as the line of vision of a vehicle driver on a driver's seat 5 when he looks back, and the real world image taken by the camera 7 may be projected by a projector 8 on a retro-reflective surface formed on an inside face of the center pillar 14 or the rear pillar 15. In this case, the camera 7 may be mounted on a door mirror 9, a door or the vehicle body outside a vehicle compartment 1, and the projector 8 may be mounted on a rear view mirror 10, on a roof 12 that includes an overhead console 13, or a headrest 5a of the driver's seat 5 in the same manner as in the above-mentioned embodiments.

Although embodiments of the present invention have been described in detail, the present invention can be modified in a variety of ways without departing from the subject matter of the present invention described in the claims.

What is claimed is:

1. A vehicular visual assistance system comprising:
  a retro-reflective surface formed on an inside face of a pillar that is in a position obstructing a view of a vehicle driver seated on a driver's seat within a vehicle compartment;
  a camera mounted on the vehicle outside the vehicle compartment on a door mirror which takes a real world image outward from the pillar in a direction that is substantially the same as the line of vision of the vehicle driver on the driver's seat; and
  a projector which directly receives the real world image taken by the camera and directly projects said real world image continuously in real time toward the retro-reflective surface of the pillar, the projector being fixedly disposed within the vehicle compartment at a position close to the eyes of the vehicle driver on the driver's seat and the projector projects the real world image as received by the camera.

2. The vehicular visual assistance system according to claim 1, wherein the projector is mounted on a rear view mirror.

3. The vehicular visual assistance system according to claim 1, wherein the projector is mounted on a roof.

4. The vehicular visual assistance system according to claim 1, wherein the projector is mounted on a headrest of the driver's seat.

5. The vehicular visual assistance system according to claim 1, wherein the camera is mounted on a substantially forward facing surface of a door mirror.

6. A vehicular visual assistance system comprising:
  a retro-reflective surface on an inside face of a visual obstruction, the visual obstruction located in a vehicle compartment in a position obstructing a view of a vehicle driver seated on a driver's seat within the vehicle compartment, the retro-reflective surface covering substantially the entire inside face thereof;

a camera mounted on an outside portion of the vehicle compartment, said camera obtains a real world image outward from the visual obstruction of the vehicle in a direction that is substantially the same as the line of vision of the vehicle driver on the driver's seat; and a projector which directly receives and continuously, directly displays the real world image taken by the camera in real time onto the retro-reflective surface of the visual obstruction, the projector being secured within and secured to a portion of the vehicle compartment at a position close to the eyes of the vehicle driver on the driver's seat so as to project the image along a line that is substantially the same as the line of vision of the vehicle driver on the driver's seat.

7. A vehicular visual assistance system comprising:

a retro-reflective surface formed on an inside face of a pillar that is in a position obstructing a view of a vehicle driver seated on a driver's seat within a vehicle compartment;

a camera mounted on the vehicle outside the vehicle compartment which takes a real world image outward from the pillar in a direction that is substantially the same as a line of rearside vision of the vehicle driver on the driver's seat when the vehicle driver looks back; and a projector operatively connected to directly receive an image from said camera, the projector fixedly disposed within the vehicle compartment at a position close to the eyes of the vehicle driver on the driver's seat;

wherein said projector directly projects the real world image in real time taken by the camera toward the retro-reflective surface of the pillar.

8. The vehicular visual assistance system according to claim 7, wherein the camera is mounted on a side mirror of the vehicle.

9. The vehicular visual assistance system according to claim 7, wherein the projector is mounted on a rear view mirror.

10. The vehicular visual assistance system according to claim 7, wherein the projector is mounted on an interior roof portion that includes an overhead console.

11. The vehicular visual assistance system according to claim 7, wherein the projector is mounted on a headrest of the driver's seat.

12. A vehicular visual assistance system comprising:

a retro-reflective surface formed on an inside face of a pillar that is in a position obstructing a view of a vehicle driver seated on a driver's seat within a vehicle compartment;

a camera mounted on the vehicle outside the vehicle compartment on an outer face of a vehicle body at a position in the proximity of the pillar which takes a real world image outward from the pillar in a direction that is substantially the same as the line of vision of the vehicle driver on the driver's seat; and a projector which projects the real world image as directly received from the camera and projects said real world images continuously in real time toward the retro-reflective surface of the pillar, the projector being fixedly disposed within the vehicle compartment at a position close to the eyes of the vehicle driver on the driver's seat.

13. The vehicular visual assistance system according to claim 12, wherein the camera is mounted on an outer face of a vehicle body at a position on the pillar.

14. A vehicular visual assistance system according to claim 12, wherein the retro-reflective surface is formed by coating the inside face of the pillar with a retro-reflective material.

15. A vehicular visual assistance system according to claim 12, wherein the retro-reflective surface is formed by affixing the inside face of the pillar with a retro-reflective material.

16. A vehicular visual assistance system according to claim 12, wherein during operation of the vehicular visual assistance system, the pillar is effectively made virtually transparent by the projection of the real world image thereon, and wherein the projection of the real world image on said pillar eliminates a blind spot which would be present absent said projection.

17. The vehicular visual assistance system according to claim 12, wherein said camera directly feeds said real world images to the projector for projection thereof on said retro-reflective surface of said pillar.

18. The vehicular visual assistance system according to claim 12, wherein said projector is fixedly disposed within and secured to a part of said vehicle compartment proximate an eye level of the driver when the driver is seated on the driver's seat.

* * * * *